United States Patent
Krimer

(10) Patent No.: US 12,504,878 B1
(45) Date of Patent: Dec. 23, 2025

(54) MECHANISM FOR EFFICIENT ACCESSING TO MEMORY CONTROLLERS WITH NON-POWER-OF-TWO SIZED MEMORY

(71) Applicant: Google LLC, Mountain View, CA (US)

(72) Inventor: Evgeni Krimer, Haifa (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/668,893

(22) Filed: May 20, 2024

Related U.S. Application Data

(60) Provisional application No. 63/547,601, filed on Nov. 7, 2023.

(51) Int. Cl.
 *G06F 3/06* (2006.01)

(52) U.S. Cl.
 CPC .......... *G06F 3/0604* (2013.01); *G06F 3/0644* (2013.01); *G06F 3/0683* (2013.01)

(58) Field of Classification Search
 CPC ..... G06F 3/0604; G06F 3/0644; G06F 3/0683
 See application file for complete search history.

(56) References Cited

U.S. PATENT DOCUMENTS

| | | | |
|---|---|---|---|
| 6,381,668 B1 * | 4/2002 | Lunteren | G06F 12/0607 711/E12.079 |
| 7,884,829 B1 * | 2/2011 | Van Dyke | G06F 12/10 345/568 |
| 2004/0225858 A1 | 11/2004 | Brueggen | |
| 2005/0050290 A1 | 3/2005 | Delaney et al. | |
| 2009/0187798 A1 * | 7/2009 | Kim | G11C 16/08 365/185.11 |
| 2018/0019006 A1 * | 1/2018 | Brandl | G11C 11/408 |
| 2021/0227361 A1 * | 7/2021 | La Fratta | G06F 12/0607 |

OTHER PUBLICATIONS

Extended European Search Report for Euorpean Patent Application No. 24211100.3 dated Mar. 14, 2025. 7 pages.

* cited by examiner

*Primary Examiner* — Ryan Bertram
(74) *Attorney, Agent, or Firm* — Lerner David LLP

(57) ABSTRACT

A system including a memory space that is accessible for reading or writing data, a plurality of N memory devices including physical locations corresponding to the memory space, wherein a size of each memory device is not a power of two, and is a multiple of a power of two by a factor of k, wherein k is an integer, and one or more processors. The processors assign addresses of the memory space to a plurality of N*k regions and map each of the plurality of N memory devices to a subset of the plurality of N*k regions.

20 Claims, 5 Drawing Sheets

FIG. 3

MECHANISM FOR EFFICIENT ACCESSING TO MEMORY CONTROLLERS WITH NON-POWER-OF-TWO SIZED MEMORY

CROSS-REFERENCE TO RELATED APPLICATIONS

The present application claims the benefit of the filing date of U.S. Provisional Patent Application No. 63/547,601, filed on Nov. 7, 2023, the disclosure of which is hereby incorporated herein by reference.

BACKGROUND

Modern computing systems often utilize multiple memory controllers mapping the memory space over multiple memory devices for data and code storage and access. The memory controllers are responsible for implementing memory access operations to/from memory devices, such as instructing read and write operations within the memory space.

Spreading access across memory devices using multiple memory controllers has the benefit of increasing overall access bandwidth. In this regard, many memory access requests may be sent to memory devices in parallel, and the requests may be handled simultaneously by multiple memory controllers. Each address in the memory space may be mapped to a corresponding physical location in one of the memory devices, such that each location is accessible to the memory controllers through a single address. In an ideal system, every physical location is mapped by the memory space and is accessible to one of the memory controllers.

When the number of memory controllers is a power of two, a hashing algorithm may be used to map the physical locations to their respective addresses. However, when the number of memory controllers is not a power of two, the same hashing algorithm cannot be used. One known alternative mapping technique for non-power of two memory controllers separates the memory space into a number of regions based on address bits. This known technique is effective for evenly distributing a memory space among a number of regions when the size of each memory device itself is a power of two, such as 32 GB or 64 GB. However, for other size memory devices that are not a power of two, the entire memory space cannot be easily divided into regions without introducing "holes," which are regions of the memory space that are not mapped to physical memory and therefore cannot be accessed by the memory controllers. "Holes" refer to non-contiguous memory space utilization, such as when a power of two size memory space larger than the physical memory is created, parts of the memory space that are not backed by physical memory are avoided from being used. Another approach would use an underutilized physical memory, such as when a power of two size memory space smaller than the physical memory is created and parts of the physical memory are not mapped to the memory space. The resulting memory space would be non-contiguous or not all of the physical memory will have been utilized, which are significant drawbacks. Furthermore, to address these drawbacks, software specialization is required to take these holes into account, which creates inefficiency in the system.

SUMMARY

The present disclosure provides an improved memory access technique that enables utilization of the full memory space by a non-power of two number of memory controllers, even when the size of the memory device itself is not a power of two.

One aspect of the disclosure provides for a system including: a memory space that is accessible for reading or writing data; a plurality of N memory devices including physical locations corresponding to the memory space, wherein a size of each memory device is not a power of two, and is a multiple of a power of two by a factor of k, wherein k is an integer; and one or more processors configured to: assign addresses of the memory space to a plurality of N*k regions; and map each of the plurality of N memory devices to a subset of the plurality of N*k regions.

In some examples, each subset of the plurality of N*k regions may include exactly K regions, whereby K is less than N and is a power of two.

In some examples, K may be the largest value that is a power of two and that is less than N.

In some examples, the one or more processors may be configured to map more than one memory device to each region of the plurality of N*k regions, and map the same number of memory devices to each region of the plurality of N*k regions. In some examples, k is equal to 3.

In some examples, the memory space may include a plurality of blocks of system level cache memory associated with a plurality of core processing units.

In some examples, the one or more processors may be configured to: for each region: select n top address bits associated with the region, wherein n is equal to $\log_2(N*k)$; calculate a remainder of the n top address bits when divided by N; and divide the memory devices among the N*k regions according to the calculated remainders.

In some examples, the one or more processors may be configured to, for each memory device: apply a masking algorithm that specifies which of the regions that the memory device is not mapped to; and map the memory device to the regions not specified by the masking algorithm.

In some examples, the system may further include N memory controllers, whereby each memory controller is connected to a corresponding one of the N memory devices. The N memory controllers may be included in a chip.

Another aspect of the disclosure is directed to a method including: assigning, by one or more processors, addresses of a memory space that is accessible for reading or writing data to a plurality of N*k regions; and mapping, by the one or more processors, each of a plurality of N memory devices to a subset of the plurality of N*k regions, wherein a size of each memory device is not a power of two, and is a multiple of a power of two by a factor of k, wherein k is an integer.

In some examples, each subset of the plurality of M regions may include exactly K regions, wherein K is less than N and is a power of two. In some examples, K may be the largest value that is a power of two and that is less than N.

In some examples, more than one memory device may be mapped to each region of the plurality of N*k regions, and the same number of memory devices may be mapped to each region of the plurality of N*k regions. In some examples, k is equal to 3.

In some examples, assigning addresses of the memory space involves assigning blocks of system level cache memory to the plurality of N*k regions.

In some examples, the method may further include: for each region: selecting, by the one or more processors, n top address bits associated with the region, wherein n is equal to $\log_2(N*k)$; calculating, by the one or more processors, a remainder of the n top address bits when divided by N; and dividing, by the one or more processors, the memory devices among the N*k regions according to the calculated remainders.

In some examples, the method may further include, for each memory device: applying, by the one or more processors, a masking algorithm that specifies which of the regions that the memory device is not mapped to; and mapping, by the one or more processors, the memory device to the regions not specified by the masking algorithm.

In some examples, the method may further include dividing, by the one or more processors, both the memory controllers and the system level cache into a plurality of non-overlapping clusters; assigning, by the one or more processors, the memory addresses to the plurality of clusters; and for at least one cluster, assigning, by the one or more processors, addresses of the memory space of the cluster to the plurality of N*k regions and mapping each of the plurality of N memory controllers to a subset of the plurality of N*k regions within the cluster.

In some examples, the method may further include: assigning, by the one or more processors, the memory addresses to the cluster using a power of two hashing algorithm; and within the at least one cluster, determining, by the one or more processors, to which system level cache blocks of the cluster the memory addresses are assigned using a non-power of two hashing algorithm.

BRIEF DESCRIPTION OF THE DRAWINGS

FIG. 3 is a diagram illustrating memory space allocation in accordance with an aspect of the present disclosure.

DETAILED DESCRIPTION

Overview

When the memory device is a multiple of a power of two by a factor of k, the memory space can be represented as N*k regions, whereby N is the total number of memory devices and k is the factor, such that each region corresponds to a subset of the memory space that is exactly the size of a power of two. For example, if k=3, such as for N memory devices having a size of 48 GB (which itself is a multiple of 16 GB by a factor of 3) or 96 GB (which itself is a multiple of 32 GB by a factor of 3), then the memory space corresponding to the memory devices may be divided into N*3 regions.

Continuing with the example of k=3, each of the N*3 regions of the memory space can then be mapped to a given number K of the total memory devices of the memory space. Thus, each memory device is used in exactly K*3 regions. The value of K is a power of two, but otherwise may vary. In some instances, K may be chosen to be the largest value for which K<N and K is a power of two.

For example, in a memory space corresponding to physical addresses of 10 memory devices and accessed by 10 memory controllers, the value of N=10 and the value of K may be chosen to equal 8. In such an example, the memory space may be divided into 30 regions, and each region may map to 8 of the 10 memory devices. Thus, each memory device will be used in 24 of the 30 regions.

The systems and techniques presented in this disclosure permit for memory devices having a size that is not a power of two to be fully utilized without creating holes, even when the number of memory controllers accessing the memory device is itself not a power of two. This leads to an overall improvement in the efficiency of the memory access operations in such non-power of two configurations, thereby opening up possibilities for new arrangements of memory controllers and memory devices of different sizes. Increasing the available options of memory controllers and memory devices without affecting efficiency can facilitate better customization of the computing systems, which in turn may reduce the overall waste and total costs for building and maintaining these computing systems.

Example Systems

Figure 1:
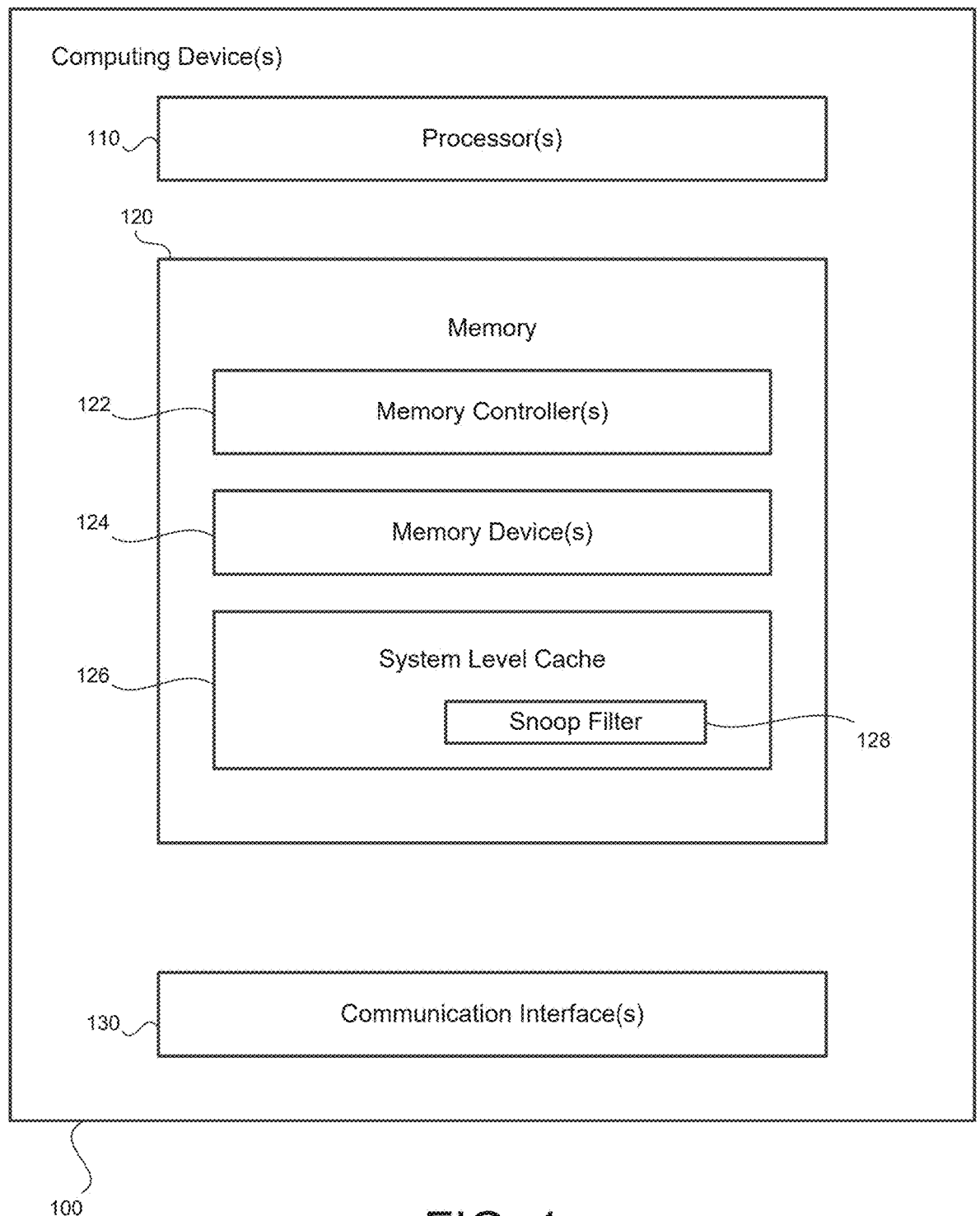
FIG. 1 is a block diagram of an example system in accordance with an aspect of the present disclosure.

FIG. 1 is a block diagram illustrating an example system including one or more computing devices 100. The computing devices 100 may include one or more processors 110, memory 120, and one or more communication interfaces 130 for transmitting and receiving information, such as data or code representing guidelines or instructions for writing, accessing or processing the data. In some examples, the computing devices 100 may include a single-core or multi-core chip. In some examples, the computing devices 100 may include both the single-core or multi-core chip as well as further devices connected to the chip, such as one or more memory devices 124.

The one or more processors 110 may include a CPU core in communication with the memory 120. The core may be a microprocessor residing on a chip, a multi-core processor, or any other known processor, e.g., a GPU, FPGA, ASIC such as a TPU, etc. While only one block is shown in FIG. 1, any number of CPU cores may be included. In some examples, the one or more processors may include dedicated control logic, one or more microcontrollers, or both.

The memory 120 may include a combination of memory controllers 122, memory devices 124 and system level cache 126 for handling incoming memory access requests, such as read or write requests. The memory controllers 122 may be configured to communicate with the memory devices 124 to access the memory space corresponding to the requested data. The memory devices 124 may include any one or more types of memory, such as read-only memory, random access memory, removable storage media, cache, registers, or the like. For instance, the memory devices may include dynamic random access memory (DRAM) modules, which may or may not include a one or more dual in-line memory modules (DIMMs). Other examples of the memory devices 124 may include high-bandwidth memory (HBM). The memory modules may be connected to the processor 110 and other components of the computing devices 100.

Figure 2:
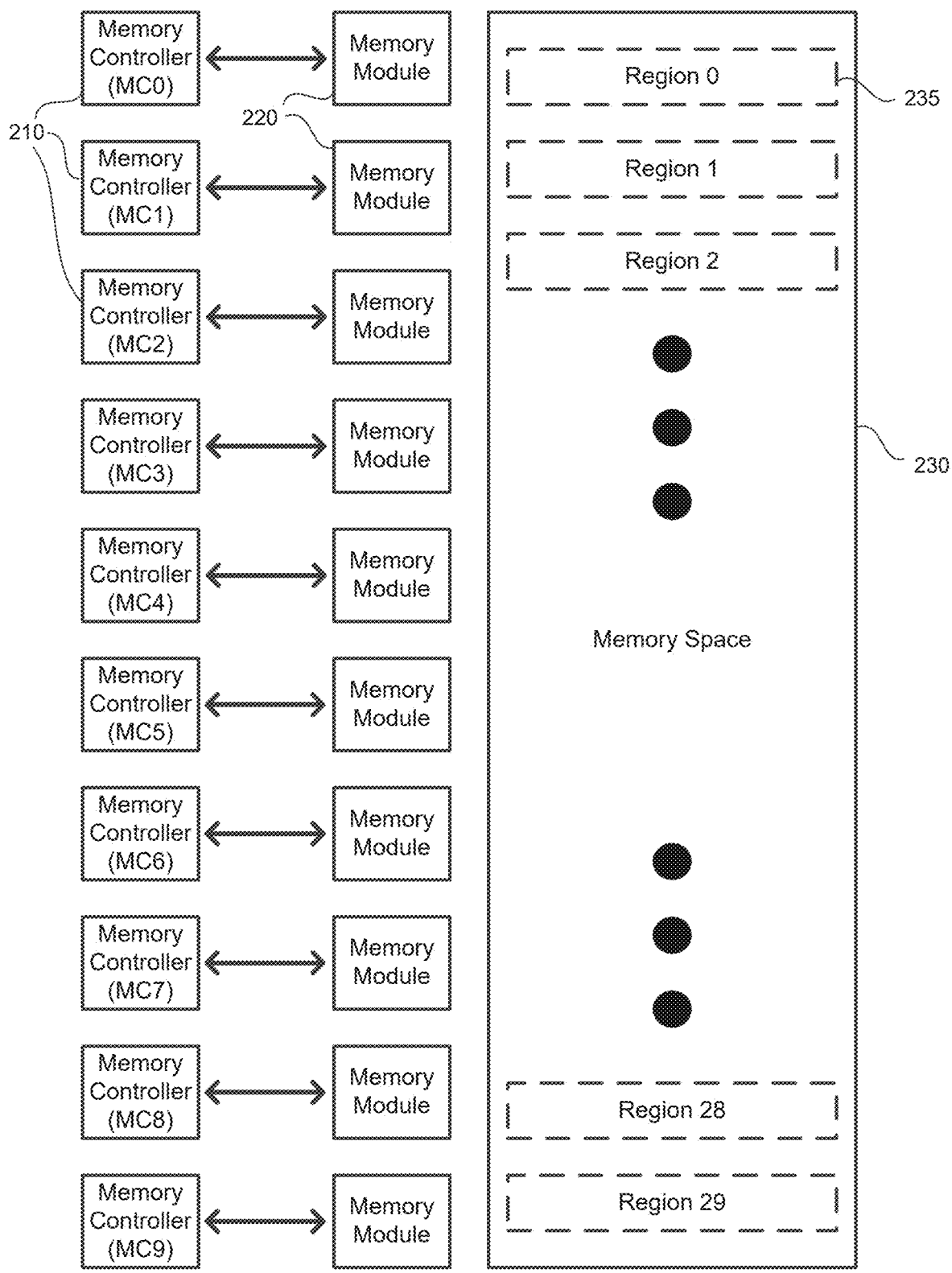
FIG. 2 is a block diagram of an example arrangement of memory in accordance with an aspect of the present disclosure.

FIG. 2 is a block diagram illustrating an example arrangement of memory controllers and memory devices. In the example of FIG. 2, a system including 10 memory controllers 210 labelled MC0 through MC9 is shown. In other examples, a different number of memory controllers may be included. The total number of memory controllers and memory devices is referred to herein as the value "N,"

Each memory controller 210 is connected to a respective memory device or memory module 220 for accessing a memory space 230. Thus, the total number of memory devices 220 equals the total number of memory controllers 210, that is the value N, which in the example of FIG. 2 equals 10. Each memory device 220 may itself connect to a given amount of accessible memory through memory channels. The accessible memory of all of the memory devices 220 collectively make up the memory space 230.

Although the total number of memory devices 220 may be any number, the techniques of the present disclosure are most beneficial for arrangements in which the total number of memory devices is not equal to a power of two, since other techniques may be used for arrangements in which the total number of memory device is equal to a power of two. Therefore, for purposes of the present disclosure, it is assumed that the value of N is not a power of two, meaning that the number of memory controllers and memory devices is not 2, 4, 8, 16 and so on.

The available memory space of each memory device may be any amount that is a multiple of a power of two. For instance, 48 GB and 96 GB memory modules are readily available and could be used to implement the techniques of the present disclosure, since 48 is a multiple of 16 (which is a power of two) by a factor of 3, and 96 is a multiple of 32 (which is also a power of two) also by a factor of 3. For further instance, if a memory module were to have a size of 40 GB, which is a multiple of 8 by a factor of 5, or 80 GB, which is a multiple of 16 by a factor of 5, such memory modules could likewise be used to implement the techniques of the present disclosure.

The memory space 230 itself may be divided into and include multiple regions 235. The number of regions 235 into which the memory space is divided is a function of the size of the memory modules. In particular, the number of regions 235 is set to equal to the total number of memory devices 220 (which is equal to the total number of memory controllers 210) multiplied by the factor by which the size of memory devices 220 is greater than a power of two. The value of this factor is referred to herein as the value "k," In the example of FIG. 2, there are 10 memory devices 220. Therefore, if each memory device were 48 GB or 96 GB in size, meaning that the space of each memory device is a factor of 3 greater than a multiple of two (48 being a factor of three greater than 16 and 96 being a factor of 3 greater than 32), then N=10, k=3, and the total number of regions 235 in the memory space would be N*k or 10*3=30. As shown in FIG. 2, there are 30 regions labeled Region 0 through Region 29. As described in greater detail herein, each memory device 220 may connect to a respective memory controller 210, and each region of the memory space 230 may be mapped from multiple ones of the memory devices 220 and, by extension, multiple ones of the memory controllers 210 (MC0-MC9). Thus, more than one memory device 220 may be used to access a particular address range within the memory space 230, although not all memory devices 220 will be used to access that particular address range.

In some examples, the arrangement of the memory controllers 210 between the requesting nodes and memory devices 220 may operate as a coherent hub interface (CHI) in which a cache of the shared memory space 230 is consistent for all requesting nodes.

Returning to FIG. 1, in some examples, the memory 120 may further include one or more blocks of system-level cache (SLC) 126, also known as last-level cache (LLC). In the example of FIG. 1, a single block of SLC 126 is shown, although in other examples, multiple blocks of SLC may be included in the system 100. The multiple blocks may be distributed throughout the system, and may be implemented as multiple instances. Also, in the example of FIG. 1, the block of SLC 126 is shown as including a snoop filter 128 configured to monitor access requests to the shared memory of the memory space layer 230 and maintain coherency among the SLC blocks 126 monitoring the memory space layer 230. In operation, the SLC 126 may receive a memory access request from a requesting node and attempt to service the memory access request. If the requested data is not present in the SLC 126 or in other nodes according to the snoop filter 128, then the request may be communicated to a memory controller 122, 210 corresponding to a memory device 124, 220 that can service the memory access request.

Regarding the mapping of addresses between the memory controllers 210 and memory space 230 layer shown in FIG. 2, the one or more processors 110 of FIG. 1 may be configured to arrange or control this mapping of addresses between the memory space layer 230 and the memory controllers 220. Mapping addresses to the memory controllers may be accomplished by the one or more processors 110 first dividing the memory space layer 230 of the memory into a certain number of regions, selecting a certain number of bits of the addresses, and applying a hash function to the selected bits of the addresses followed by a modulo of the hashed value, whereby the modulo corresponds to a certain number of memory controllers to which the addresses of the region are assigned. In some examples, the hash function used for assignment of the memory addresses may be a power of two hashing algorithm. This process can spread the mapping of addresses evenly among the memory controllers, particularly when the number of regions of memory addresses being assigned is a power of two. When the total number of memory controllers is a power of two, this mapping can be simple as the total number of regions may be selected to be a power of two, including one, and each region assigned to all of the memory controllers. By comparison, when the total number of memory controllers in the memory control layer is not a power of two, the total number of regions into which the addresses are divided may be selected to be a different number that is not a power of two so as to distribute the addresses evenly among the non-power of two memory controllers.

Figure 3:
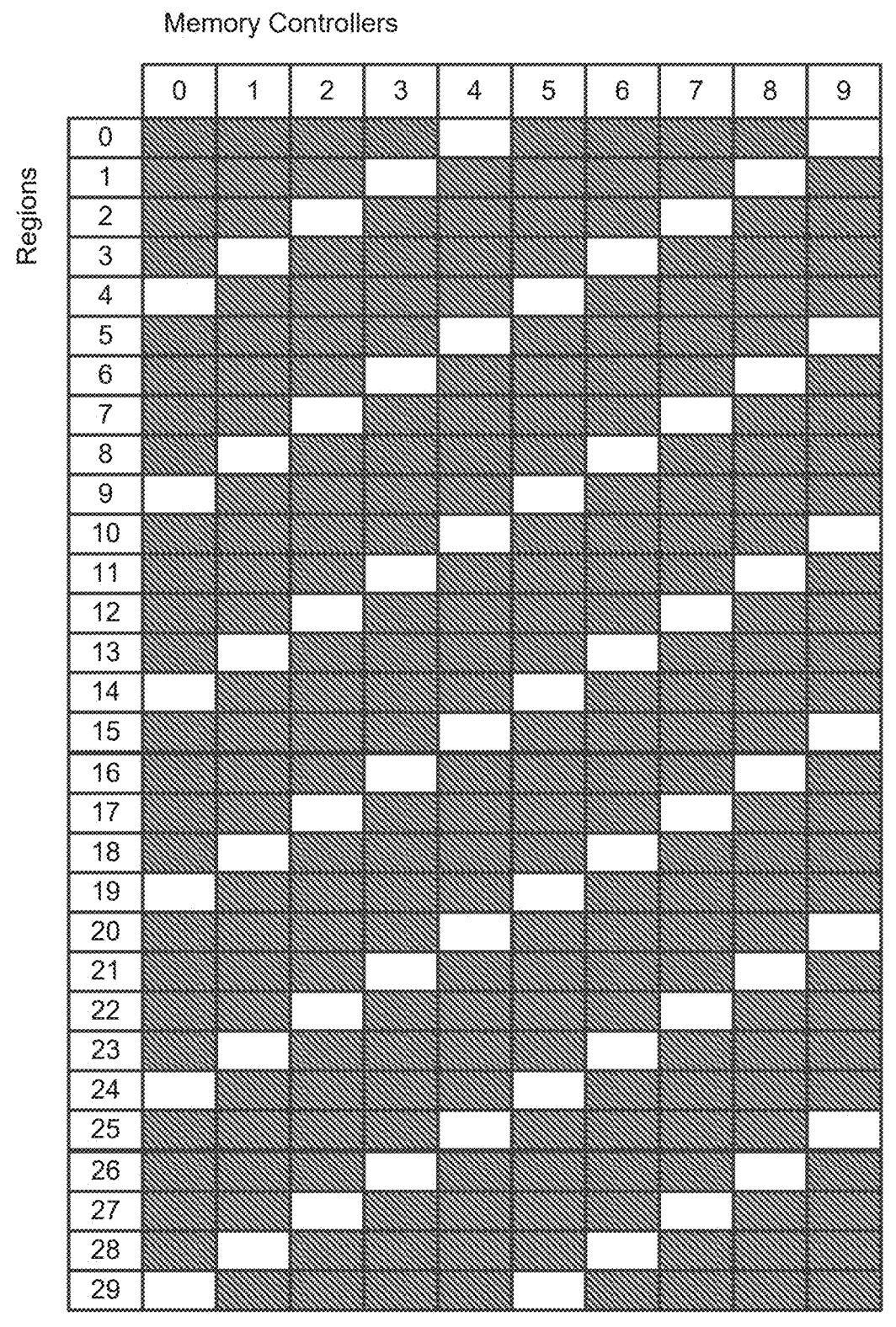

An example of a non-power of two distribution is shown in FIG. 3, in which addresses from 30 regions of a memory space (labeled 0-29) are mapped to 10 memory controllers (labeled 0-9). In the example of FIG. 3, each region of addresses is mapped to 8 out of 10 of the memory controllers, whereby mapping between a memory controller and a region is indicated by a shaded box. For instance, region 0 is mapped to memory controllers, 0, 1, 2, 3, 5, 6, 7 and 8. For further example, region 1 is mapped to memory controllers 0, 1, 2, 4, 5, 6, 7 and 9. As can be seen from FIG. 3, each region 0-29 is mapped to exactly 8 out of the 10 controllers 0-9. Furthermore, the mappings are arranged such that each memory controller is mapped to the same number of regions, which in this example is 24 regions.

In some examples, creating the mappings shown in FIG. 3 may be accomplished by, for each region of the memory space, picking the $\log_2(N*k)$ (rounded up to the next integer value) top address bits and calculating a remainder of the bits relative to N. For example, in a case with N=10 and k=3, the remainder of the top address bits for each region could be any value between 0 through 9, and for the 30 regions that the memory space is divided into, each remainder value would show up exactly 3 times.

Other algorithms having the same or similar effect of evenly distributing the regions among the memory controllers and memory devices may be used. It should further be noted that instead of using an algorithm to determine which memory controllers a given region is mapped to, it may be more efficient to use an algorithm that determines which memory controllers the given region is not mapped to, since the number of memory controllers and memory devices mapped to a given region is usually larger than the number of controllers and memory devices that are not mapped to a given region. Determining which memory controllers the given region is not mapped to may be implemented using a masking algorithm, whereby instead of instructing the memory controllers as to which regions are mapped, each region that is not mapped to a respective memory controller is masked for that memory controller.

Selecting the number of regions of memory and the number of regions mapped to each memory controller may be performed by the one or more processors 110 based on predefined rules or guidelines. One rule is that the number of regions that are mapped to each memory controller should be a k-multiple of power of two. For instance, in the example of FIG. 3, the total number of memory controllers and memory devices is 10 and the number of regions mapped to each memory controller is 24, since is the largest power of two number that is less than 10 and 24 is a multiple of 8 by a factor of three. In other instances, a smaller value may be used, such as mapping each memory controller to 12 regions of the example of FIG. 3, whereby each region would connect to 4 memory controllers and memory devices instead of to 8.

In the example of FIGS. 1 and 2, a single group of memory controllers MC0-MC9 are shown as being divided evenly among the memory devices of a single memory space. However, in other example systems, the memory space itself may be subdivided into respective memory space clusters, which may or may not be contiguous and/or interleaved, whereby memory addresses of the memory space may be addressed to different ones of the respective memory space clusters. In such an example, the respective memory space clusters may be controlled by corresponding memory controller clusters, whereby the memory controllers for one memory controller cluster are kept separate from the memory controllers of the other memory controller clusters.

Figure 4:
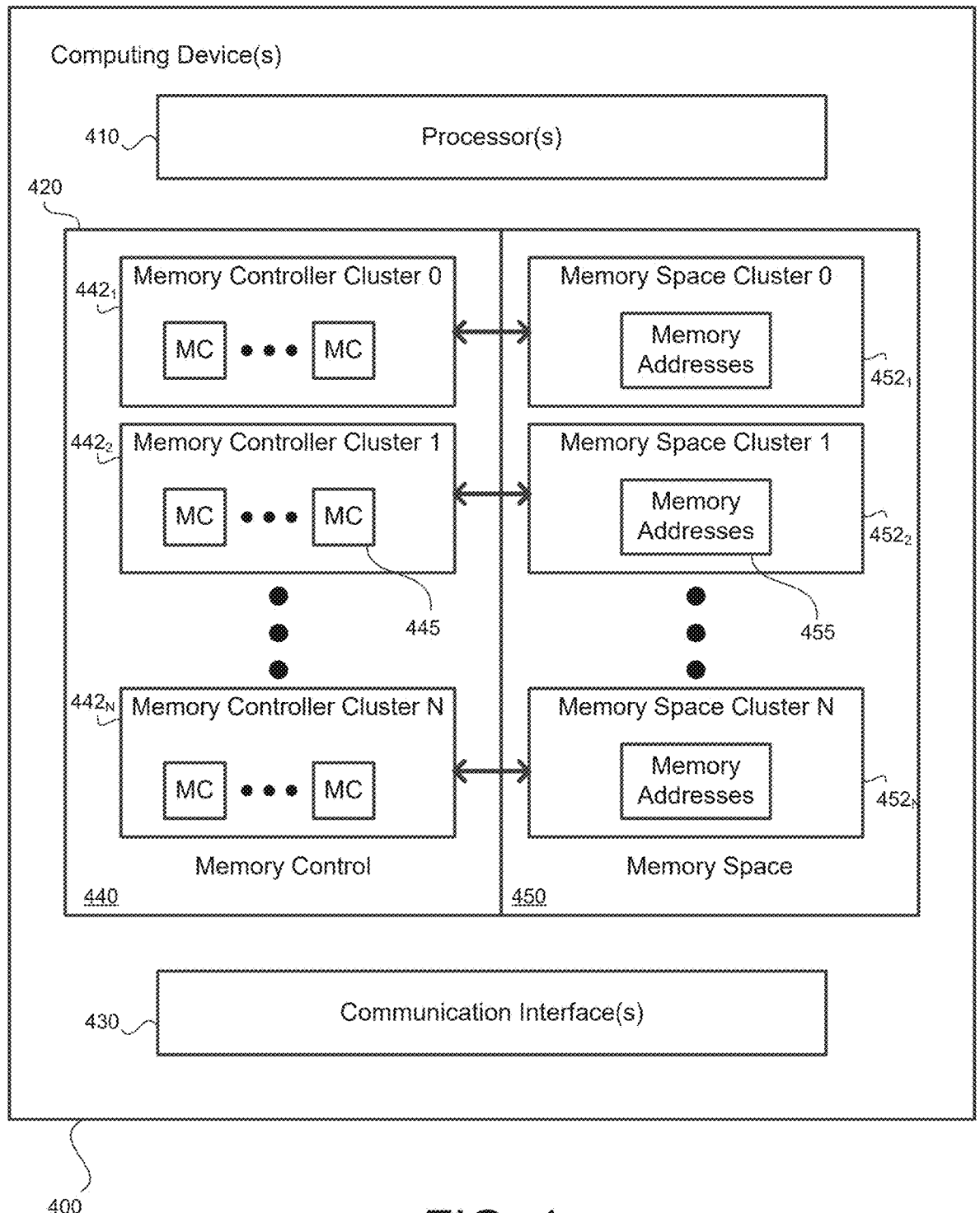
FIG. 4 is a block diagram of another example system in accordance with an aspect of the present disclosure.

Such an example system is shown in FIG. 4. Like the example system of FIGS. 1 and 2, the example system of FIG. 4, includes one or more computing devices 400 having one or more processors 410, memory 420, and communication interfaces 430 for communication with other systems or users of the system. Also, like the memory 120 of the system of FIGS. 1 and 2, the memory 420 of the system of FIG. 4 may include each of memory controllers, memory devices and a memory space. The system of FIG. 4 differs from that of FIGS. 1 and 2 in that the memory control 440 components and memory space 450 components are divided into multiple clusters, whereby each of the memory controllers (MC) 445 is mapped to a different respective memory controller cluster $442_1$-$442_N$, and the memory addresses 455 are mapped to a different respective memory space clusters $452_1$-$452_N$ linked to a corresponding one of the memory controller clusters $442_1$-$442_N$. Mapping may involve assigning each of the memory addresses 455 to its different respective memory space cluster $452_1$-$452_N$ using a power of two hashing algorithm.

Although the memory devices are not shown in FIG. 4, it should be understood that each memory controller included in each of the memory control clusters $442_1$-$442_N$ may communicate with a corresponding memory device to access the memory addresses to which it is mapped in its corresponding memory space cluster $452_1$-$452_N$. As such, each pair of memory control clusters $442_1$-$442_N$ and memory space clusters $452_1$-$452_N$ may also include its own respective memory devices.

Regarding the clustering of memory controllers into memory controller clusters, the number of memory controller clusters may vary from one system to another depending on several factors, including but not limited to the total number of memory controllers, locality of the memory controllers relative to one another, and locality of the memory devices included in the memory space relative to one another.

While in some cases a higher number of memory controllers may correlate to a higher number of memory controller clusters, it should be appreciated that this is not the only way that the total number of memory controllers may factor into the number of memory controller clusters. For instance, the number of memory controllers per memory controller cluster may be chosen to facilitate the efficient division of memory controllers into regions as described in connection to FIG. 2. Since the preferred total number of regions for a memory space cluster may vary from one system to another, preferences for a certain number of memory controllers per memory controller cluster may similarly vary from one system to another.

Mapping the memory space clusters $452_1$-$452_N$ associated with the respective memory controller clusters $442_1$-$442_N$ to the memory controllers 445 may involve hashing addresses of the memory space among the memory space clusters $452_1$-$452_N$.

Example Methods

Figure 5:
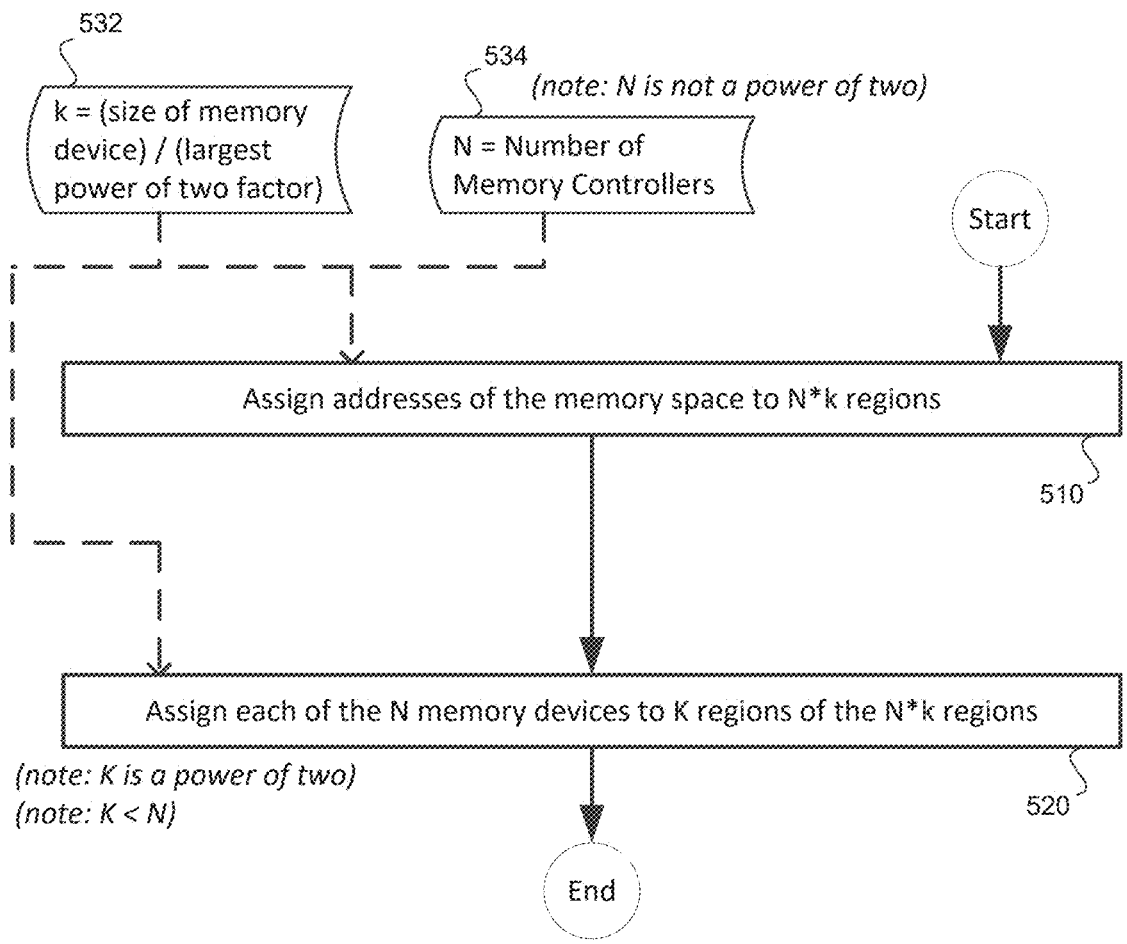
FIG. 5 is a flow diagram of an example process in accordance with an aspect of the present disclosure.

FIG. 5 is a flow diagram illustrating an example process 500 for mapping memory addresses to memory controllers in accordance with aspects of the present disclosure. The process 500 may be executed by one or more processors, such as the one or more processors of the computing device(s) of FIG. 1. It should be understood that in at least some cases, while the one or more processors are used to perform the mapping, once the mapping is created, memory access requests may then be handled without the one or more processors, such as at the SLC itself.

At block 510, the one or more processors may assign addresses of the memory space to a number of regions, referred to as "N*k" regions, in which N is the number of memory controllers and memory devices, and in which k is the factor by which the size of the memory devices is greater than a power of two. The value of k may be determined by dividing the size of the memory devices by the largest power of two that is a factor to that size. For instance, for a memory device of size 48 GB, the largest power of two that is a factor of 48 is 16, so the value of k is 48/16=3. The values of "N" "k" may be predetermined and provided as an input for process 500, as shown by blocks 532 and 534 of FIG. 5. Each address of the memory space may belong to only one region.

At block 520, the one or more processors may map each of the memory controllers and memory devices to a subset of the N*k regions, meaning that those memory controllers and memory devices mapped to a certain region can access the addresses associated with that region. The number of regions mapped to each memory controller and memory device, referred to herein as "K," may be the same for each memory controller. Stated another way, each memory controller and memory device may have access to the same amount of space in the memory space. Furthermore, it should be appreciated that while the value of K is necessarily lower than the value N, the value K does not have to be a factor of N, since each region can be mapped to multiple memory controllers. One requirement for the value of K is that it should be a power of two so that hashing of the memory space across the controllers is efficiently spread among the memory controllers to avoid latency issues or locality problems.

The systems and methods described herein may be used to facilitate memory access requests across multiple memory controllers and memory devices even when the total number is not a power of two and the size of the memory devices is not a power of two. This is accomplished without introducing holes to the memory space and without requiring complicated algorithms, thereby maintaining good efficiency for the system without increasing costs and without degrading bandwidth. This may be particularly advantageous for chip developers seeking ways to increase the size of memory devices on a chip without having to raise the size by another factor of two. This may also be advantageous for system designers in that available memory devices whose size is not a power of two may now be easily used to facilitate the memory access requests without the aforementioned drawbacks. Stated another way, a chip may be designed with any number of memory devices and for many sizes of memory devices, not just for memory devices having a size that is a power of two. Stated another way, this can lead to greater chip design flexibility without degrading overall chip performance or degrading performance of some memory elements of the chip.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
   a memory space that is accessible for reading or writing data;
   a plurality of N memory devices including physical locations corresponding to the memory space, wherein a size of each memory device is not a power of two, and is a multiple of a power of two by a factor of k, wherein k is a positive integer; and
   one or more processors configured to:
   assign addresses of the memory space to a plurality of N*k regions; and
   map each of the plurality of N memory devices to a subset of the plurality of N*k regions.

2. The system of claim 1, wherein each subset of the plurality of N*k regions includes exactly K regions, wherein K is less than N and is a power of two.

3. The system of claim 2, wherein K is the largest value that is a power of two and that is less than N.

4. The system of claim 2, wherein the one or more processors are configured to map more than one memory device to each region of the plurality of N*k regions, and map the same number of memory devices to each region of the plurality of N*k regions.

5. The system of claim 1, wherein k is equal to 3.

6. The system of claim 1, wherein the memory space includes a plurality of blocks of system level cache memory associated with a plurality of core processing units.

7. The system of claim 1, wherein the one or more processors are configured to:
   for each region:
   select n top address bits associated with the region, wherein n is equal to $\log_2(N*k)$;
   calculate a remainder of the n top address bits when divided by N; and
   divide the memory devices among the N*k regions according to the calculated remainders.

8. The system of claim 1, wherein the one or more processors are configured to, for each memory device:
   apply a masking algorithm that specifies which of the regions that the memory device is not mapped to; and
   map the memory device to the regions not specified by the masking algorithm.

9. The system of claim 1, further comprising N memory controllers, wherein each memory controller is connected to a corresponding one of the N memory devices.

10. The system of claim 9, wherein the N memory controllers are included in a chip.

11. A method comprising:
    assigning, by one or more processors, addresses of a memory space that is accessible for reading or writing data to a plurality of N*k regions; and
    mapping, by the one or more processors, each of a plurality of N memory devices to a subset of the plurality of N*k regions, wherein a size of each memory device is not a power of two, and is a multiple of a power of two by a factor of k, wherein k is a positive integer.

12. The method of claim 11, wherein each subset of the plurality of M regions includes exactly K regions, wherein K is less than N and is a power of two.

13. The method of claim 12, wherein K is the largest value that is a power of two and that is less than N.

14. The method of claim 12, wherein more than one memory device is mapped to each region of the plurality of N*k regions, and the same number of memory devices are mapped to each region of the plurality of N*k regions.

15. The method of claim 11, wherein k is equal to 3.

16. The method of claim 11, assigning addresses of the memory space comprises assigning blocks of system level cache memory to the plurality of N*k regions.

17. The method of claim 11, further comprising:
    for each region:
    selecting, by the one or more processors, n top address bits associated with the region, wherein n is equal to $\log_2(N*k)$;
    calculating, by the one or more processors, a remainder of the n top address bits when divided by N; and
    dividing, by the one or more processors, the memory devices among the N*k regions according to the calculated remainders.

18. The method of claim 11, further comprising, for each memory device:
    applying, by the one or more processors, a masking algorithm that specifies which of the regions that the memory device is not mapped to; and
    mapping, by the one or more processors, the memory device to the regions not specified by the masking algorithm.

19. The method of claim 11, further comprising:
dividing, by the one or more processors, both the memory controllers and the system level cache into a plurality of non-overlapping clusters;
assigning, by the one or more processors, the memory addresses to the plurality of clusters; and
for at least one cluster, assigning, by the one or more processors, addresses of the memory space of the cluster to the plurality of N*k regions and mapping each of the plurality of N memory controllers to a subset of the plurality of N*k regions within the cluster.

20. The method of claim 19, further comprising:
assigning, by the one or more processors, the memory addresses to the cluster using a power of two hashing algorithm; and
within the at least one cluster, determining, by the one or more processors, to which system level cache blocks of the cluster the memory addresses are assigned using a non-power of two hashing algorithm.

* * * * *